US008332347B2

(12) United States Patent
Agrawal et al.

(10) Patent No.: US 8,332,347 B2
(45) Date of Patent: Dec. 11, 2012

(54) SYSTEM AND METHOD FOR INFERRING A NETWORK OF ASSOCIATIONS

(75) Inventors: Amit Agrawal, Pune (IN); Rohit Vaishampayan, Pune (IN); Ashutosh, Pune (IN)

(73) Assignee: Persistent Systems Limited, Pune (IN)

( * ) Notice: Subject to any disclaimer, the term of this patent is extended or adjusted under 35 U.S.C. 154(b) by 666 days.

(21) Appl. No.: 12/374,762

(22) PCT Filed: Jul. 25, 2007

(86) PCT No.: PCT/IN2007/000317
§ 371 (c)(1),
(2), (4) Date: Jan. 22, 2009

(87) PCT Pub. No.: WO2008/044242
PCT Pub. Date: Apr. 17, 2008

(65) Prior Publication Data
US 2010/0005051 A1    Jan. 7, 2010

(30) Foreign Application Priority Data

Jul. 28, 2006    (IN) .......................... 1195/MUM/2006

(51) Int. Cl.
*G06N 5/00* (2006.01)
(52) U.S. Cl. .......................................... 706/55; 706/45
(58) Field of Classification Search .................... 706/55, 706/45
See application file for complete search history.

(56) References Cited

U.S. PATENT DOCUMENTS

| | | | |
|---|---|---|---|
| 6,266,668 B1 | 7/2001 | Vanderveldt et al. | |
| 6,272,478 B1 | 8/2001 | Obata et al. | |
| 6,324,533 B1 | 11/2001 | Agrawal et al. | |
| 6,708,163 B1 | 3/2004 | Kargupta et al. | |
| 6,985,890 B2 | 1/2006 | Inokuchi | |
| 7,024,417 B1 | 4/2006 | Russakovsky et al. | |

OTHER PUBLICATIONS

Arenas, et al., Synchronization in complex networks, Physics Reports, Dec. 12, 2008, pp. 1-80.*
Patrick C.H. Ma et al., An Evolutionary Clustering Algorithm for Gene Expression Microarray Data Analysis, IEEE Transactions on Evolutionary Computation, vol. 10, No. 3, Jun. 2006, pp. 296-314.
Candida Ferreira, Gene Expression Programming: A New Adaptive Algorithm for Solving Problems, Complex Systems, vol. 13, 2001, pp. 87-129.
International Search Report for PCT Appl. PCT/IN2007/00317, 3 pages.
Written Opinion for PCT Appl. PCT/IN2007/00137, 12 pages.

* cited by examiner

*Primary Examiner* — Wilbert L Starks
(74) *Attorney, Agent, or Firm* — Foley & Lardner LLP

(57) ABSTRACT

A network association mining algorithm and associated methods are presented which accepts data from biological and other experiments and automatically produces a network and attempts to explain the behavior of the biological or other system underlying the data using evolutionary techniques. The model and associated methods aim to identify the interrelationships consistent with data and other prior knowledge supplied to the system. The network is represented in terms of coupled dynamical system. These dynamical systems are represented by differential or difference equations to educe these dynamical systems and coupling between them, an evolutionary algorithm is used. The output of the linkage finder could assist scientists to better understand the systems underlying and to guess at surrogate data.

15 Claims, 4 Drawing Sheets

SYSTEM AND METHOD FOR INFERRING A NETWORK OF ASSOCIATIONS

The present invention relates to interpreting the information contained in these data sets and to combine various aspects captured into a technologically usable knowledge.

More particularly, a network association mining algorithm and associated methods which accepts data from biological and other experiments and automatically produces a network model.

Still particularly, the network association mining algorithm and associated methods which attempts to explain the behaviour of the biological or other system underlying the data using evolutionary techniques.

This invention relates to modern experiments generate voluminous data capturing diverse aspects of complex phenomena. To deal with the problem of interpreting the information contained in these data sets and to combine various aspects captured into a technologically usable knowledge, something of a paradigm shift has emerged in recent times. This new paradigm relies on ability to form multiple competing hypotheses based on the observed data, the ability to validate or rule out multiple hypotheses at the same time and the ability to do it in an automatic way with minimal human intervention. Networks of relationships between different data entities of interest and computational representations of such networks are fast becoming a corner stone of such approaches. The representation of the phenomena in terms of networks has the advantage of data reduction and these networks help in uncovering underlying processes at work, resulting in increased insight and better technological applications. Consequently, network analysis has become widely applicable methodology in applications to understand financial, social, physical or biological data and have helped understanding these very complex relationships.

Consequently, methodologies to infer, or reverse engineer such networks from empirical data are of central importance in a number of disciplines. As an illustrative example, the cellular behaviour and phenotype of biological organism is determined by dynamical activity of large networks of co-regulated genes. Indeed, one of the central goals in systems biology and functional genomics is to understand the interactions between numbers of genes. Each gene consists of a number of coding base pairs of DNA which are transcribed into mRNA and then translated into proteins. Many of these proteins further regulate the production of mRNA either by their own genes or by other genes.

Because gene expression is regulated by proteins, which are themselves gene products, statistical associations between gene mRNA abundance levels, while not directly proportional to activated protein concentrations, should provide clues towards uncovering gene regulatory mechanisms. The working of all the genes thus forms a genetic regulatory network, and may be thought of as a dynamical system. Inputs include elements of the physical world which affect the activity of the transcription factors, and outputs may be considered as the concentrations of the translated proteins or, at a deeper level, the transcribed mRNA. While the proteins are ultimately responsible for cellular function, the mRNA is more easily experimentally measured via DNA microarrays.

Consequently, the advent of high throughput microarray technologies to simultaneously measure mRNA abundance levels across an entire genome has spawned much research aimed at using these data to construct conceptual "gene network" models to concisely describe the regulatory influences that genes exert on each other. These developments in microarray technology have enabled a shift in the way gene interactions can be considered, namely from a reductionist's serial view to the combinatorial approach. The combinatorial approach assumes that gene activity is a combined action of genes rather than it is influenced by a single gene. The expression of a gene, i.e., the production by transcription and translation of the protein for which the gene codes, can be controlled by the presence of other proteins, both activators and inhibitors, so that the genome itself forms a switching network with vertices representing the proteins and directed edges representing dependence of protein production on the proteins at other vertices.

Genome-wide clustering of gene expression profiles provides an important first step towards this goal by grouping together genes that exhibit similar transcriptional responses to various cellular conditions, and are therefore likely to be involved in similar cellular processes. However, the organization of genes into co-regulated clusters provides a very coarse representation of the cellular network. In particular, it cannot separate statistical interactions that are irreducible (i.e., direct) from those arising from cascades of transcriptional interactions that correlate the expression of many non-interacting genes. More generally, as appreciated in statistical physics, long range order (i.e., high correlation among non-directly interacting variables) can easily result from short range interactions. Thus correlations or any other local dependency measure cannot be used as the only tool for the reconstruction of interaction networks without additional assumptions. Thus, methodologies to reverse engineer cellular, protein interaction and genetic networks are important to a number of life sciences, biotechnology, pharmaceutical and other applications.

The goal of such, inference from any kind of data is to represent the process as a graph or a network, where each data entity (e.g. gene or protein) is a node in the graph and an edge or connection between nodes represents an association between the nodes (e.g. interactions between proteins of other molecules, collaborations and competitions in a, social group, dependencies in financial indices, citations in literature etc.). The connections themselves may have different interpretation based on the context: it can be a parent child relationship most likely to explain the data, evidence of physical interactions or other statistical/information theoretic correlations and indices.

PRIOR ART

A U.S. Pat. No. 6,266,668 claims, A method for assigning relevance of inter-linked objects within a database using an artificial neural network ("ANN") to provide a customized search tool for a user, comprising:
searching said database for one or more inter-linked objects satisfying at least one or more relevance metrics; assigning, with said ANN, a weight to each of said inter-linked objects; and identifying to said user each of said one or more weighted inter-linked objects having an assigned weight greater than some predetermined threshold value.

The U.S. Pat. No. 6,708,163 further claims, "A method of generating a data model from distributed, partitioned, non-homogenous data sets", comprising: a) generating a set of orthogonal basis functions that define the data model; b) computing an initial set of coefficients for the basis functions based on a set of local data; c) refining the initial set of coefficients based on data extracted from the distributed, partitioned, non-homogenous data sets; and d) using the refined coefficients and orthogonal basis functions to predict a plurality of relationships between the distributed, partitioned, non-homogenous data sets.

The U.S. Pat. No. 6,272,478 further claims, "A data mining apparatus for discovering and evaluating association rules existing between data items of a data base comprising: an association rule generator for receiving data items from a data base and forming association rules between the data items; an evaluation criterion assignor with which a user assigns an evaluation criterion for assessing the association rules, the assigned evaluation criterion being related to the user's purpose; an association rule evaluator for calculating a value for each association rule generated by said association rule generator as a function of the evaluation criterion assigned by the user with said evaluation criterion assignor and at least one of support for the association rule and confidence for the association rule; and a performance result display for displaying the association rules generated by said association rule generator based on the value of each association rule calculated by said association rule evaluator.

The U.S. Pat. No. 6,324,533 further claims, "A method for mining rules from an integrated database and data-mining system having a table of data transactions and a query engine, the method comprising the steps of a) performing a group-by query on the transaction table to generate a set of frequent 1-itemsets; b) determining frequent 2-itemsets from the frequent 1-itemsets and the transaction table; c) generating a candidate set of (n+2)-itemsets from the frequent (n+1)-itemsets, where n=1; d) determining frequent (n+2)-itemsets from the candidate set of (n+2)-itemsets and the transaction table using a query operation; e) repeating steps (c) and (d) with n=n+1 until the candidate set is empty; and f) generating rules from the union of the determined frequent itemsets.

The U.S. Pat. No. 7,024,417 further claims, "A method for data mining using an algorithm, the algorithm having a build task, a test task, and an apply task, each task having a number of parameters, each parameter having a type, the method comprising: retrieving a signature associated with the algorithm, said signature including, for the build task, the number of parameters and the type of each parameter associated with said task, as well as an information field for each parameter associated with said task, said information field indicating the meaning and/or recommended usage of said parameter, said signature also including, for the build task, one or more coefficients for the algorithm; and creating a template for said the build task based on said signature, said template indicating one or more of said parameters that need to be initialized by a user to invoke said task and one or more model values that are to be derived from a data set; and executing said template to create a mapping between said one or more coefficients and said one or more model values.

The U.S. Pat. No. 6,985,890 further claims, "A graph structured data processing method for extracting a frequent graph that has a support level equal to or greater than a minimum support level, from a graph database constituting a set of graph structured data, said method comprising: changing the order of vertex labels and edge labels and extracting frequent graphs in order of size; coupling two size k frequent graphs of size k that match the conditions: i) between the matrixes $X_k$ and $Y_k$ elements other than the k-th row and the k-th column are equal, ii) between the graphs $G(X_k)$ and $G(Y_k)$ which are represented by adjacency matrixes $X_k$ and $Y_k$, vertex levels other than the k-th vertex are equal and the order of the level of said k-th vertex of said graph $G(X_k)$ is equal to or lower than the order of the level of the k-th vertex of said graph $G(Y_k)$; iii) between the graphs $G(X_k)$ and $G(Y_k)$ the vertex level at the k-th vertex is equal and the code of said adjacency matrix $X_k$ is equal to or smaller than the code of said adjacency matrix $Y_k$; and iv) said adjacency matrix $X_k$ is a canonical form; and returning a set $F_k$ of adjacency matrixes of a frequent graph having a size k, where k is a natural number, and a set $C_{k+1}$ of adjacency matrixes $c_{k+1}$ of candidate frequent graphs having a size k+1; the obtained graph as candidate of frequent graphs; when said adjacency matrix $c'_{k+1}$ is a frequent graph as the result of scanning of said graph database, adding, to a set $F_{k+1}$ of adjacency matrixes of a frequent graph having said size $k_{k+1}$;

said adjacency matrix $c'_{k+1}$ and an adjacency matrix $c_{k+1}$ that represents the same structure as a graph expressed by said adjacency matrix $c'_{k+1}$, obtaining a candidate frequent graph from a set of adjacency matrixes that represent a candidate of frequent graph, where the return value is a set of adjacency matrixes that represent a candidate of frequent graph for which all the induced subgraphs are frequent graphs; deleting, from said set $C_{k+1}$, said adjacency matrix $c_{k+1}$ of a candidate frequent graph that includes a less frequent graph as an induced subgraph having said size k; selecting only one adjacency matrix-$c'_{k+1}$ from a sub-set of adjacency matrixes $c_{k+1}$ that represent the same graph; normalizing the candidate frequent matrix and returning a canonical form from among adjacency matrixes that represent a size k candidate of frequent graph; and extracting a frequent graph.

These prior art algorithms and associated methods are different from the proposed invention for the development of high quality System and Method for Inferring a Network of Associations. Most of the network association mining algorithms have underlying assumptions which restrict their applicability and functionality. These methods do not take into account a number of factors during inference. The factors neglected include stability indices of the resultant network, prevalent network motifs, different type of statistical correlations obtained by considering the data horizontally and vertically partitioned and prior information about some of the linkages which might be known. Furthermore, there is no methodology to attenuate weights or relative importance of these factors. Some of the prior art also concentrates on approximating functions of Boolean variables whereas the current invention deals with real numbers. The current invention also aims to achieve a solution of the stated problem by using stochastic, evolutionary algorithm which allows it to infer based on limited data points and allows one to propose and test a number of candidate solutions in an automated way. The invention does not have need for a large database of graphs or networks or prior known training data i.e. it aims to infer based on only supplied data set(s) and does not rely on a supervised training (e.g. as in Artificial Neural Networks).

Furthermore, the proposed methodology does not require the elements to be configured in a network in a predefined way, relying instead on the evolutionary methodology to infer such configuration and topology.

This invention seeks to overcome the limitations of the prior art.

Another object of the invention is to represent such a network of relationship in terms of dynamical systems of continuous or discrete type and to infer differential or difference equations governing such dynamical systems.

Another object of this invention is to incorporate stability factors of the candidate solutions, error estimates and statistical contributions, and prior known knowledge into process of inference.

Another object of the invention is to analyze such networks or populations of such networks regarding their structural, topological or community properties and identify possible key nodes.

The spherical blocks denote various genes involved in this community

Name name description
CDC27 cell division cycle
CLN1 cyclin
CLN2 cyclin
SWI4 SWItching deficient
CLN3 cyclin
MBP1 MluI-box Binding (cell cycle)
CLB5 CycLin B
MCM2 MiniChromosome Maintenance
CDC20 cell division cycle
CLB6 CycLin B
SIC1 Substrate/Subunit Inhibitor of Cyclin-dependent protein kinase
CDC28 cell division cycle
SWI6 SWItching deficient
PHO85 PHOsphate metabolism
PCL2 PHO85 CycLin
CDC53 cell division cycle
CDC4 cell division cycle
ORC2 Origin Recognition Complex
GRR1 Glucose Repression-Resistant
CDC6 cell division cycle
FAR1 Factor Arrest
FUS3 cell FUSion
CDC45 cell division cycle The mapping of the block numbers to gene names is given below.
301 CDC45
302 CDC20
303 CDC4
304 CLB5
305 CDC53
306 FAR1
307 ORC2
308 PHO85
309 FUS3
310 PCL2
311 SWI4
312 SWI6
313 CLB6
314 CLN3
315 CDC6
316 CDC27
317 CLN1
318 CLN2
319 CDC28
320 MBP1
321 SIC1
322 MCM2
323 GRR1

Figure 4:
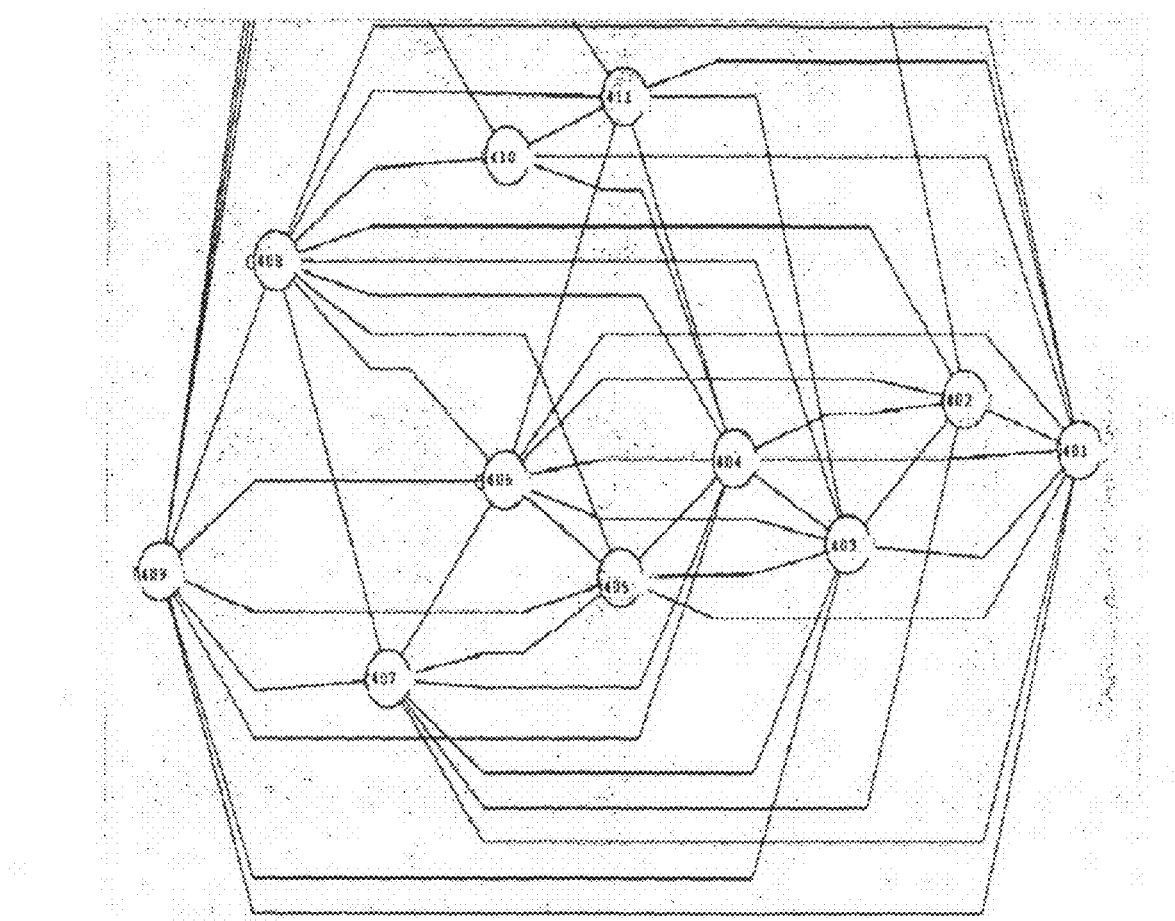

FIG. 4: Hierarchical Organization of Nodes-(Nodes are genes in Yeast Cell Cycle Network): Ranks hierarchically the position of key genes in yeast cell cycle communities network in accordance with illustrative embodiment of the invention. The spherical blocks denote various genes and the mapping of the block numbers to gene names is given below.
401 CDC28
402 CLN1
403 CLN2
404 SIC1
405 CLB5
406 CDC20
407 CDC4
408 CDC27
409 MCM2
410 GRR1
411 CLB6

SUMMARY OF THE INVENTION

It is assumed that the underlying process for the network formation can be modelled as a system of coupled dynamical systems, each dynamical system is described by a state vector x(t) In our model the state corresponds to the expression level of a gene at a given time t. This state could be dependent on values of other data entities. Thus the network consists of a collection of N dynamical systems characterized by a state vector $$x=(x1,x2 \ldots xj) j<=N$$

The state of system is updated, synchronously or asynchronously, by an evolution rule or local dynamics. This evolution rule can be continuous or discrete. Each node representing the data entity can have a different local dynamics, i.e.

$$x_i = f_i(t), \mu)$$

$$x_i^{n+1} = f(x_k^n, \mu)$$

Where xk denotes the state vector (x1 ... xk) and I runs from 1 to N. the parameter vector $\epsilon$ denotes the parameters that can influence the local dynamics.

These dynamical systems are coupled together in a network whose topology is given by a matrix Wik No assumptions are made about the nature of coupling (i.e. no assumptions like nearest or next nearest neighbor coupling, global or mean field coupling etc.).

$$x_i(t+1) = \left(1 - \frac{\epsilon_{ii}}{N}\right) f_i^l(x_i) + \frac{1}{N} \sum_k \epsilon_{ik} W_{ik} f_k^p(x_k)$$

denotes the dynamics of the whole network, where $\epsilon i$ is a parameter matrix representing the coupling strengths of respective edges in the network.

Thus in the model, the genes influence each other in two ways: though the function
fi, which we call direct influence and through the coupling term in the equation which we refer to as indirect influence.

The indirect influence is useful in a number of different situations. The data from the experiments is many times noisy and error prone. Also, also usually a number of experiments are averaged to produce a time course profile. Due to these factors, a variable which should appear in the direct influence is not sometimes detected i.e. averaging or noise may mask the effect of a variable. The indirect influence allows one to incorporate effects of such "left out" variable.

Thus there are a number of unknown that we want to infer from the data. The form of each of the functions is unknown, as are the parameters governing the equations. The connection matrix and the coupling weight matrix are also unknowns. To reduce the number of unknowns, in the remaining discussion below we would be concentrating on unweighted networks in which all edges have equal weights and thus we can replace the matrix by a constant. This is the only free parameter in our system. The downside of this is that we have to check for the variation of behavior with respect to this parameter. This can be done either numerically or analytically by considering the bifurcation structure of the network dynamical system with this parameter. Towards this aim we techniques from stability analysis of dynamical system. The aim of such an exercise is to find the optimum parameter value for the given data set and then fix the value at this value.

It is also instructive to look at the stability of the networks from another angle.

The networks that occur in nature have to preserve their function in face of random perturbation to variables as well as parameters. Thus the networks that are inferred should be robust to such variation and should have good stability properties. To tackle the problem of inferring a large number of unknowns from a finite, and often short time profile data we use an evolutionary algorithm.

Due to their stochastic nature, evolutionary algorithms are often the best (and sometimes the only) option to deal with incomplete data. This is possible mainly because the stochasticity is theoretically capable of generating all possible configurations (including effects of hidden variable and uncertainty) and if the selection mechanism is robust and targeted we can zero down to the vicinity of true solution reasonably fast. An evolutionary algorithm indicates a subset of evolutionary computation, which is a part of artificial intelligence. It is a generic term used to indicate any population-based metaheuristic optimization algorithm that uses mechanisms inspired by biological evolution, such as reproduction, mutation, recombination, natural selection and survival of the fittest. Candidate solutions to the optimization problem play the role of individuals in a population, and the cost function determines the environment within which the solutions "five". Evolution of the population then takes place after the repeated application of the above operators.

In essence the Evolutionary algorithms occupy a particular place in the hierarchy of stochastic optimization methods. This hierarchy has evolved over time from Monte-Carlo, Metropolis Stein and Stein (MSS) algorithms to simulated annealing, evolutionary strategies and then onto genetic algorithms and genetic programming. While the inspiration and metaphors for the earlier algorithms came from the domain of physical processes, later on more and more biological processes have been increasingly used. This hierarchy can be progressively described as follows:

(1) Monte-Carlo Methods

This was one of the earliest approaches in stochastic optimization. Random solutions are generated and only a subset of them is accepted based on some criterion (e.g. value of a random configuration). Selecting random-solutions allows one to explore the search space widely and hence drive the system towards desired solution. However, since there is no fine tuning of acceptability criterion, this method can be slow when there are multiple solutions possible which are widely distributed in search space.

(2) Simulated Annealing

To refine the acceptability criterion a notion of suitably defined "energy" and "temperature" was introduced. The acceptable solution is the one among the randomly selected solutions, as in Monte Carlo, which, in addition, also minimizes the energy of the system. In essence the algorithm is a stochastic steepest descent method which finds global minima.

(3) Evolutionary Strategies

This was the first evolutionary algorithm where the notion of a population was introduced. The solutions among this population are accepted by some heuristic criterion (such as one fifth success rate), The concept of randomly changing the solution mutation was introduced here.

(4) Genetic Algorithms

Genetic algorithms improved the Evolutionary Strategies approach by introducing two powerful notions. One was that of applying a cross over operator to diversify the population and second was to represent the population as a collection of strings. In addition it generalized the acceptability criteria from a heuristic one fifth rule to a more generic kind i.e. a fitness function.

(5) Genetic Programming

This was the first approach in which the solutions are selected not based on their structural representation but based oh their applicability. In other words, the fitness of the individuals is not determined by its structural representation, but by the behaviour of the structural representation. This kind of behaviour is obtained by representing the population as trees of computational modules and actually evaluating the result of such computation (6) Genotype-Phenotype Based Programming The next step in using biological metaphors for evolutionary computing is separation on the structural representations i.e. Genotypes from their behaviour Phenotype. While genetic algorithms deal directly with genotypes and genetic programming deals directly with phenotypes, it is instructive to evolve the two populations simultaneously. This offers the possibility of diversifying and selecting the string populations and obtaining fitness bounds on phenotypes.

Figure 1:
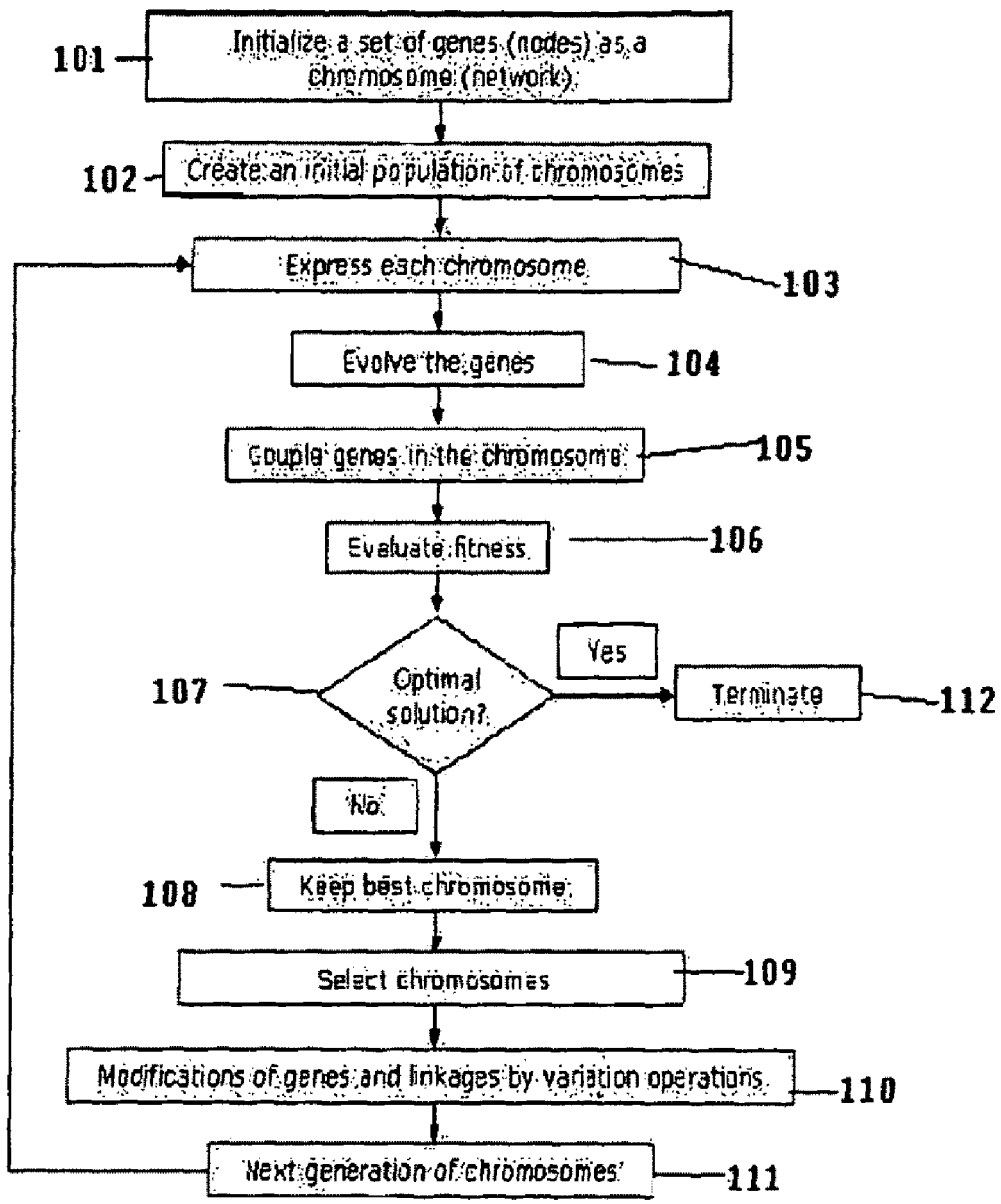
FIG. 1: The Flow for the Evolutionary Algorithm: A flowchart showing the operation of the inference algorithm in accordance with the embodiment of the invention. The blocks in this diagram describe the various stages in flow of algorithm
Figure 2:
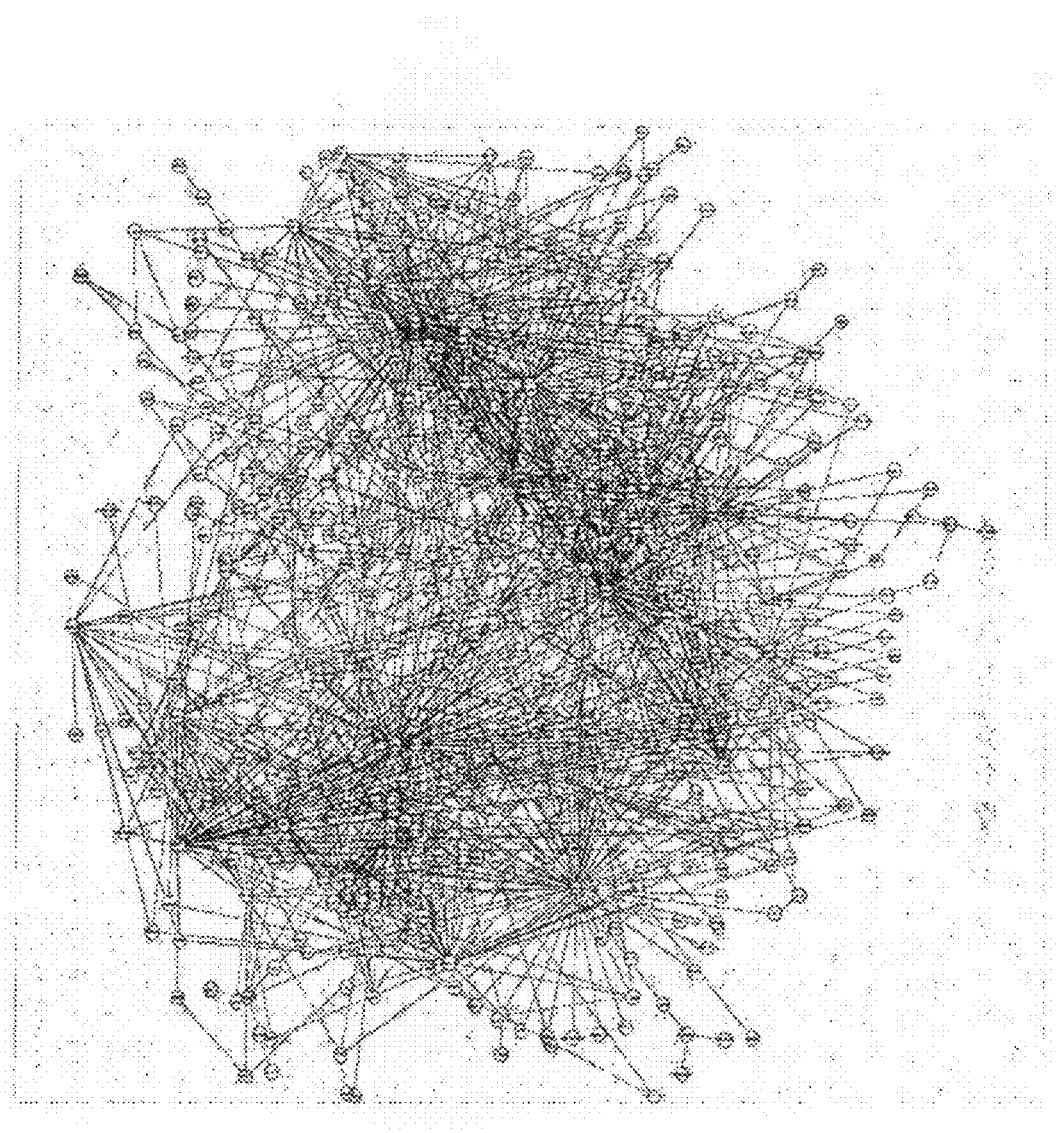
FIG. 2: An Example Network (for Yeast Cell Cycle): A inferred regulatory networks for yeast (*Saccromyces Cervisiae*) in accordance with illustrative embodiment of the invention. The diagram describes the network obtained for the association of genes in yeast (*Saccromyces Cervisiae*). This diagram illustrates the use for inferring of complex networks. The small circles denote various genes and the link (line) between them describes the association between these various entities. The diagram also illustrates the presence of some nodes which are preferentially attached to a large number of other nodes and thus indicative of a potentially important role within the network.
Figure 3:
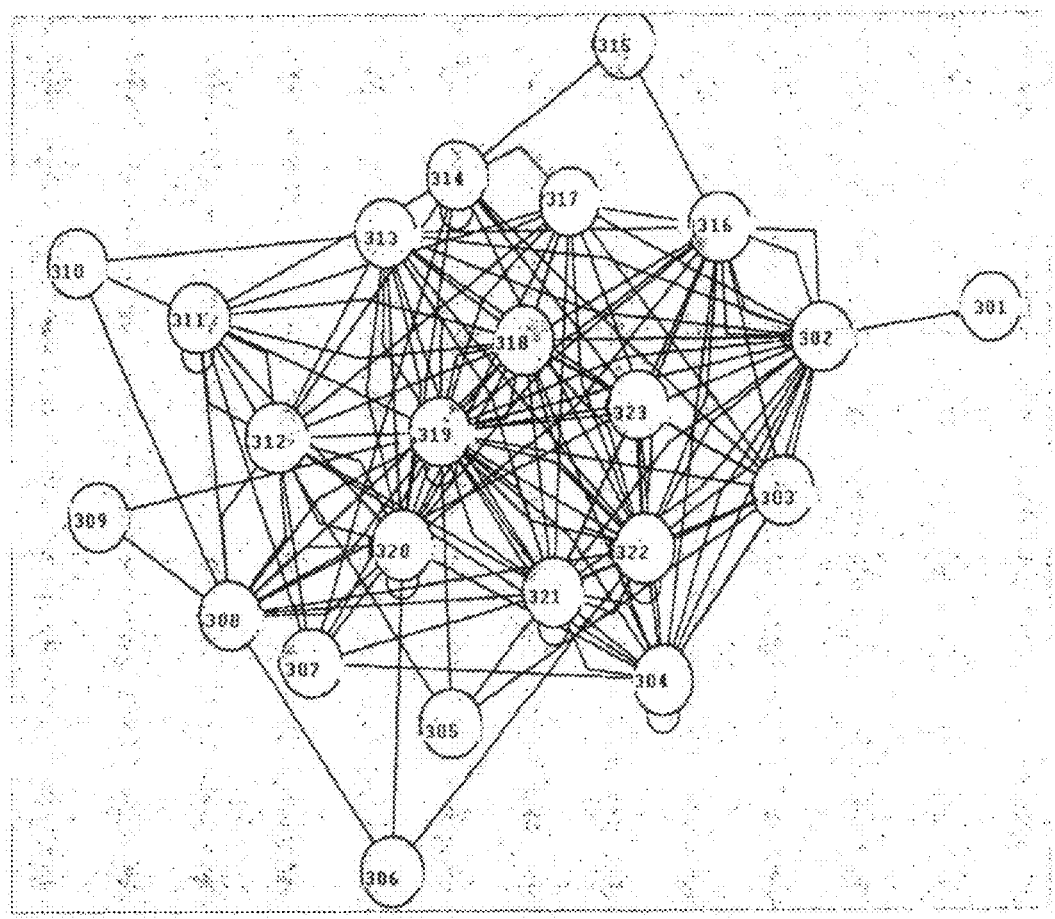
FIG. 3: A Community from the Network (Yeast Cell Cycle Data): A community structure for cell cycle in yeast from the inferred regulatory network in accordance with illustrative embodiment of the invention.

Because they do not make any assumption about the underlying fitness landscape, it is generally believed that evolutionary algorithms perform consistently well across all types of problems. This is evidenced by their success in fields as diverse as engineering, art, biology, economics, genetics, operations research, robotics, social sciences, physics and chemistry. The current algorithm is based on the separation of genotype/phenotype mechanisms. An initial population of chromosomes is evolved by applying the genetic operators and fitness of the individual is evaluated by expressing it (FIG. 1 describes a flowchart).

This expression is done in form of (multiple) trees. Thus the fitness criteria operates on the trees while the genetic operations are applied on the chromosomes. The expressed trees and sub-trees can have various degree of complexity thus allowing one to handle objects with various levels of complexity with the same chromosome. Each chromosome can be composed of multiple genes thus allowing one to break up a given problem in sub parts and evolve these parts simultaneously. The genes are strings whose characters can represent terminals as well as operators. The operators can be mathematical or logical functions. Multiple genes are linked together by a linking function which can be a mathematical or logical function.

The genetic operators in are mutation, transposition, recombination, gene recombination, insertion sequence transposition, root transposition. A greater number of genetic operators allows for continuous infusion of new individuals into the population. This results in a better success rate with evolutionary time. Due to the particular structure of genes the resulting trees are always valid and thus no effort is needed in validation. The nodes of the tree represent the operators and the leaves represent the terminals.

We allow the selection by a number of sampling methods including roulette wheel sampling and selection via replacement. An amount of elitism, where a number of best individuals are always carried over to the next population is incorporated. This fraction is determined by an external parameter. Each tree is evaluated to obtain a difference or a differential equation and resultant equation provides the local dynamics of the node.

The fitness function that determines the survival of an individual is actually the core of any evolutionary algorithm. This function critically determines the performance, the convergence and the outcome of the algorithm. The current invention incorporates a novel fitness function which can accommodate a wide variety of factors such as goodness of fit to a given data set, stability of the inferred networks, different types of correlations present in the data, weights given to known prevalent motifs in the networks, contributions from other types of data or experiments on the same problem and incorporation of prior knowledge. The general form of the fitness function is thus $$F(\text{network}) = F_{err}(\text{network}) + F_{motif}(\text{network}) + F_{corr}(W_{ij}) + F(\text{prior})(W_{ij}) + F_{s_1}(J_{ij}) + F_{s_2}(J_{ij})$$

Where Ferr denotes the fitness contribution due to the goodness of fit data, Fmotif is the contribution depending on how many prevalent motifs are found in the network, Fcorr is the contribution from correlations (longitudinal or transverse), Fprior is the fitness weightage assigned by prior knowledge. The prior knowledge can include contributions from other data sets (of the same type or from different experiments). Fs1 and Fs2 are contributions from two stability measures obtained from the network. A particular form of fitness function used for a given problem can include a configuration of one or more of these terms.

For example we can have the following choices $$F_{err}(\text{network}) = \sum_{k=1}^{T}\sum_{i=1}^{n} e^{\sqrt{\frac{(x_{calculated}(t_k) - x_{observed}(t_k))^2}{n}}}$$

$$F_{corr}(W) = \sum_{ij} \delta(W_{ij} - R_{ij})(R_{ij} - T^*)$$

Where $\epsilon$ is the Dirac delta function, T* is the correlation cutoff threshold and $$R_{ij} = \sqrt{\frac{\left[\sum_{t=1}^{N}(X_{it} - \overline{X}_i)\cdot(X_{jt} - \overline{X}_j)\right]^2}{\sum_{t=1}^{N}(X_{it} - \overline{X}_i)^2 \sum_{t=1}^{N}(X_{it} - \overline{X}_i)^2}}$$

The prior knowledge can be incorporated by incorporating it as connections in the weight matrix $$F_{corr}(W) = \sum_{ij} \delta(W_{ij} - P_{ij})$$

Where $P_{ij}$ is a weight matrix incorporating effect of other data sets (of the same type or different) and could itself be obtained from a weighted composition of a number of constituents. For example, for genetic networks this could be $Pij=a*Pij$(gene expression)$+b*Pij$(CHIP data)$+c*Pij$(Protein-Protein interaction)$+d*Pij$(pathway information)$+e*Pij$(mutual information)$+f*Pij$(known literature)

The stability contributions are $$S_1 = \gamma_{l_1} - \gamma_{l_2}$$

$$S_2 = \frac{\gamma l_1 - \gamma s}{\gamma l_2 - \gamma s}$$

Where $\gamma_{l_1} - \gamma_{l_2}$ is a measure of the Geshkorin disk and Jij is the Jacobian matrix of the network dynamics.

We find and characterize communities in the inferred network. Most real networks typically contain parts in which the nodes (units) are more highly connected to each other than to the rest of the network. The sets of such nodes are usually called clusters, communities, cohesive groups, or modules, having no widely accepted, unique definition. Yet it is known that the presence of communities in networks is a signature of the hierarchical nature of complex systems. In this method all cliques, i.e. complete subgraphs of the network are first found. Once the cliques are located, the clique-clique overlap matrix is prepared. In this symmetric matrix each row (and column) represents a clique and the matrix elements are equal to the number of common nodes between the corresponding two cliques, and the diagonal entries are equal to the size of the clique. The k-clique-communities for a given value of k are equivalent to such connected clique components in which the neighboring cliques are linked to each other by at least k−1 common nodes. The communities provide us with nodes of specific interest linked together as well as with the critical nodes which separate two or more communities.

As an example we illustrate with a dataset for gene expression values parameterized by time. The time series data set is arranged in a form of a matrix, where rows represent the genes involved in the experiment, and column comprises the actual time steps for which the gene expression recordings were taken. Each row of this matrix consequently represents the change in the expression profile of a particular gene for a given series of time steps. Each column of this matrix represents the expression profiles of the involved genes at a particular time point.

Our methodology is based on learning of the gene regulatory network by using a system of differential/difference equation as a model. We deal with an arbitrary form in the right hand side of differential/difference equation to allow flexibility of the model. In order to identify the system of differential/difference equations, we evolve the right hand side of the equations from the time series of the gene's expression. The right hand side of the equations is encoded in the chromosome. A population of such n geneic chromosomes is created initially. Each chromosome contains a set of n trees, i.e. an n-tuple of trees, where n is the number of genes involved in the experiment. Each chromosome in the population is expressed as an expression tree (ET) for arithmetic expression defined in the function set. The leaf nodes of the tree are the index of the expression values of a gene. Expression transforms a string representation of chromosome to a functional meaningful construct. Thus the chromosome, after expression, resembles a forest of trees representing the ETs generated by each gene. A gene expression chromosome maintains multiple branches, each of which serves as the right hand side of the differential/difference equation. These ETs representing complex mathematical functions are evolved from one time step to next. Each equation uses a distinct program. Each ET in an chromosome is linked by using the summation operator to determine the goodness of fit in terms of absolute error in expression after evolution.

The model incorporates an effect of indirect coupling during the evolution process using a undirected matrix known as the coupling matrix of gene-gene interactions.

The coupling matrix is evolved along with the evolution of the right hand side of the differential/difference equations. The overall fitness of each chromosome is defined as effect of direct coupling of the genes using the equations and indirect coupling using the coupling matrix. Presence of even a single motif in the coupling map adds to the advantage of the individual. A brute force method is applied in order to search the coupling map for presence of a bipartite fan and feed forward motif, which are statistically relevant to genetic regulatory networks A list of one and two path lengths is searched in the topology of the coupling matrix.

A one path length is simply a sequence of two nodes connected linearly; while a two path length a sequence of three nodes connected in a linear fashion. Each pair of one path lengths are checked for connections similar to that of a bipartite fan motif. Similarly each of the two path lengths is checked for the connections similar to that of a feed forward loop motif. The fitness of each of the chromosome is calculated with respect to the goodness of fit in term of absolute error in expression after evolution, the presence of motifs which are statistically prevalent in the network and the stability of the network. The time series is calculated using an fourth order Runge Kutta method, if the equations being evolved are differential equations. Other wise an iterative scheme is used in case of discovery of a difference equation. The chromosome which is closer to the target time series has the higher possibility to be selected and inherited in the next generation. When calculating the time series, some chromosomes may go overflow.

In this case the chromosomes fitness value gets so large that it gets weeded out from the population. The selection process allows the program to select chromosomes fit for evolution in the next generation. The chances of being selected for the next generation are completely depended on the fitness value of the chromosomes. Selection pressure determines the number of chromosomes, ranked according to their fitness values, that will be selected for replication in the next generation.

During replication the chromosomes are dully copied in the next generation. The best chromosome of each generation is always carried over in the next generation (elitism). The selection process is followed by a variation in the structure of the chromosomes and the coupling matrix. The structure of chromosomes is varied using various genetic operators. The genetic operators act on any section of the chromosome or a pair of chromosomes, but maintain the structural organization of the chromosome intact. The mutation operator causes a change by either, replacing a function or terminal in the chromosomes head with another (function or terminal) or by replacing a terminal in the chromosomes tail with another. A sequence of the symbols is selected from the chromosome as the Insertion Sequence (IS) transposon. A copy of this transposon is made and inserted at any position in the head of a randomly selected gene, except the first position. A sequence with as many symbols as the IS element is deleted at the end of the head of the target gene.

All Root Insertion Sequence (RIS) transposition elements start with a function and thus are chosen from among the sequence of heads. During RIS transposition the whole head shifts to accommodate the RIS element. The last symbols of the head equivalent in the number to the RIS string are deleted. The gene transposition operators transpose an entire gene from one location to another allowing duplication of the genes within the chromosome. The one-point recombination operator uses a pair of chromosomes for the sake of variation. The chromosomes are spliced at random point in both the chromosome and the material downstream of the splitting point is exchanged between the two chromosomes. A similar approach is followed in the two point recombination where there are two splitting points instead of one. In a gene recombination operation, two genes are randomly chosen between two chromosomes and exchanged. Interplay between these genetic operators beings about an excellent source of genetic diversity in the population while maintaining the syntactical correctness of the programs being evolved.

The coupling matrix is changed along with the structure of the chromosome during the variation process. The coupling matrix is varied by turning the interaction between two genes on or off. If the interaction between two genes is on, it is turned off and vice versa. The number of neighbors of each of the genes thus gets changed due to this variation bringing about a significant change in the fitness of the chromosome.

The chromosomes are evolved for a fixed number of generations or until the fitness of chromosomes has not converged to a desired value. The chromosomes are ranked according to the fitness and stability criteria and the output is a set of networks maintained by these chromosomes.

We claim:

1. A method for inferring new knowledge and insight from available data, with the method consisting of steps:
   a. representing the knowledge in terms of a model network of coupled dynamical equations of differential or difference type with the data entities as nodes and the interrelationships between the said data entities as edges or connections,
   b. choosing a model from the said representation by proposing a population of plural nodes and connections from the said representation and representing the population by strings of characters and associated trees, with the said string representation consisting of characters representing data entities as well as a choice of mathematical operators,
   c. evaluating the values of the associated trees by integrating or iterating the said differential or difference equations along branches of the trees for each candidate in the aforesaid population,
   d. assigning a fitness measure to the said candidate based on i) the comparison with the evaluated values to the data values, ii) presence of known motifs in the network, iii) stability of the network as evaluated by a linear stability analysis, iv) statistical measure of correlations in the data and v) consistency with the prior known connections in the network;
   e. Repeating steps b)-d) for a number of population and selecting the best candidate with respect to fitness measure as the aforesaid network model f. Analyzing the network corresponding to the said best individual for its i) topological ii) geometric iii) community structure and stability properties and identifying a list of key nodes representing data entities;
g. Obtaining the list and structure of communities in the network and ranking them according to their prevalence in the said population of network models;
h. Identifying and obtaining sub networks and modules by reconfiguring connections of key nodes obtained in f).

2. The method of claim 1 where the said knowledge and insight is biological knowledge and insight; knowledge about association, interrelations or interdependencies of data entities including, but not restricted to time series, financial or other network data, real, simulated or hypothesized.

3. The method of claim 1 where the said network model is a population of network models or a consensus network model over such a population.

4. The method of claim 1 wherein a network model is inferred in terms of coupled differential or difference equations from a parameterized data set with the parameter being, but not restricted to, time step measurement.

5. The method of claim 1 where the network model is inferred using an evolutionary algorithm based on separation of representation in terms of strings and associated trees.

6. The method of claim 5 where the said genetic operators consist of mutation or probabilistic selection including elitism.

7. The method of claim 5 where the said genetic operators consist of one and two point recombination, transposition, gene recombination, insertion sequence transposition and root insertion sequence transposition.

8. The method of claim 1 where the network model is inferred or ranked using the fitness measure of claim 1 d) or subparts of the said fitness measure.

9. The method of claim 1 where the method comprises of additional step of using additional genetic operators on string representations of the populations in claim 1.

10. The method of claim 1 where the said stability measures are used to infer or rank network models.

11. The method of claim 1 where the network model obtained is used to simulate data or qualitative aspects of the underlying system.

12. The method of claim 1 where the method consists of an additional step of validation of the model by experiment, knowledge from the literature, other data sets and subsequent further refinement of the model whether manual or automated.

13. The method of claim 1 where the said datasets consist of gene expression data, gene expression profiles with varying environmental conditions including time, protein interaction data and gene knockout experiment data.

14. The method of claim 1, wherein said dataset is data representative of experimental data, knowledge from the literature, patient data, clinical trial data, compliance data; chemical data, medical data, or hypothesized data.

15. The method of claim 1, wherein said dataset is multivariate, parameterized data including, but not restricted to time series data, financial data, email or other social network data, simulated data from a known network structure.

* * * * *